Feb. 28, 1950 — G. DAVIES — 2,498,982
ABRASIVE TYPE CUTTING ELEMENT AND THE MANUFACTURE THEREOF
Filed April 7, 1947

INVENTOR.
GEORGE DAVIES
BY
Emery Holcombe & Blair
ATTORNEYS

Patented Feb. 28, 1950

2,498,982

UNITED STATES PATENT OFFICE 2,498,982

ABRASIVE TYPE CUTTING ELEMENT AND THE MANUFACTURE THEREOF

George Davies, Welwyn, England, assignor to Arthur Percy Warren, East Twickenham, England Application April 7, 1947, Serial No. 739,841
In Great Britain September 10, 1945

Section 1, Public Law 690, August 8, 1946
Patent expires September 10, 1965

11 Claims. (Cl. 29—78)

This invention relates to abrasive tools provided with metal cutting faces or edges and the manufacture thereof.

Existing abrasive tools formed from carborundum and similar mineral substances are comparatively fragile which limits the dimensions and shape in which they can safely be formed and used. Further many of them show an inclination to clog and require frequent trimming which consumes them, while further they have poor thermal conductivity so that they do not carry away readily the frictional heat formed by their use. Again since their use entails the continual disintegration of their working surfaces they lose shape and size and create dust which has to be extracted or carried away by liquid and has subsequently to be disposed of. This applies to abrasive tools used both in industry and in such professions as in dentistry.

The object of the present invention is to provide improved metal-working tools and methods of manufacturing them which will reduce or overcome the difficulties encountered in the use of abrasive tools as heretofore made.

To this end according to the present invention my improved tool has a metallic cutting surface which is produced by forming pits or depressions therein and then coating the surface electrolytically with chromium or like hard metal in the shape of minute projections or nodules, which when broken off leave a multitude of sharp edges.

Preferably the chromium is applied in a known manner at such current density as to build up on the raised parts of the surface adjacent to the pits or depressions, forming a series of globules or nodules which are then broken off so as each to leave exposed the broken and highly abrasive surface of the nexus by which each globule was joined to the base metal.

The pits or depressions may be produced in any one of a number of ways, for example by mechanical means, by chemical means or electrochemical means, or a combination of such means.

In most cases the surface after or before pitting and before plating will be hardened but in other cases the metal surface may initially be sufficiently hard not to require hardening before plating. Further, where hardening is used, it will in many cases be desirable, particularly where the part to which the abrasive surface is to be applied is of small cross-section, as in the case of small files or wire which is to be rendered abrasive, to harden the base metal by rolling, drawing or swaging instead of by heat-treatment since it has been found that metals so hardened by working are less liable to hydrogen embrittlement when chromium plated than metals hardened by heat-treatment. It will be understood that such work hardening by drawing, swaging or rolling would normally have to be done before forming the pits or depressions and that usually in such instances therefore these would be formed by chemical or electrochemical means rather than by mechanical means.

The invention may be applied to a large variety of abrasive tools and may be applied to surfaces of a large variety of forms. One application of the invention is, however, shown purely by way of example in the accompanying drawings, in which.

Figure 1:
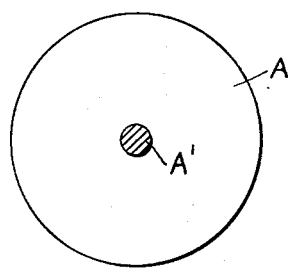
Figure 1 is a front elevation of a disc having an abrasive rim according to the invention.
Figure 2:
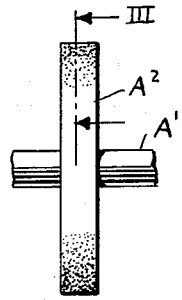
Figure 2 is a side elevation of the disc shown in Figure 1.
Figure 3:
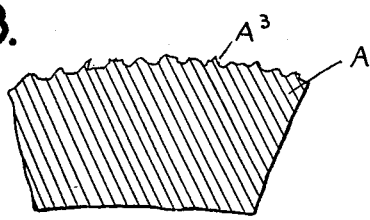
Figures 3, 4, 5 and 6 show in cross-section and on a greatly enlarged scale sections of the rim of the disc shown in Figures 1 and 2 at various stages in the production thereon of an abrasive surface according to the invention, the section being taken on the line III—III of Figure 2.

In the form of the invention illustrated, the disc is mounted upon a rotational shaft $A^1$ and has an abrasive rim $A^2$ according to the invention. This abrasive rim is produced in the following manner: First, the rim is pitted as indicated in Figure 3, either by mechanical means or by chemical or electro-chemical methods, for example, by first starting corrosion by dipping in strong hydrochloric acid and then enlarging the pits by causing some of the pits to merge into others by hanging the disc in an atmosphere charged with nitric acid fumes. This results in the production of the pits (which, though irregular, are of generally round shape) in the surface of the metal and, as will be appreciated, is really a process of artificial and controlled rusting. The process is arrested when the pits are of a size corresponding to the "grit" required in the abrasive surface.

Sometimes a "grain" is useful in the abrasive surface and this may be secured by alternating exposure of the surface to be pitted to the nitric acid atmosphere with exposure to liquid hydrochloric acid or by varying the duration of action of the two treatments, it being found that the acid fumes tend to produce circular pits, while the liquid acid tends to produce linear pits or to convert round pits into linear or vermiform pits.

The pits should, as shown, be comparatively deep with comparatively sharp edges. Further, the surface to be pitted may be hardened, for example, by heat treatment before or after pitting. Where the pits are formed mechanically, they may be produced in known manner by vibratory steel needle points or by a rotating chain mop, the links of which have rasplike projections, and it will be understood that in this case if the pitted surface is to be hardened, such hardening would conveniently be carried out after pitting.

Figure 4:
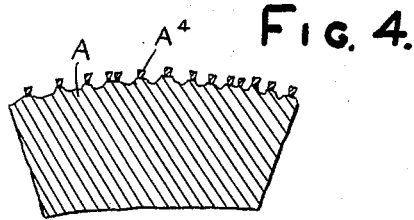
Figure 5:
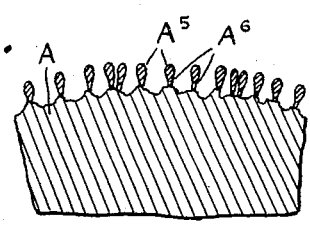
Figure 6:
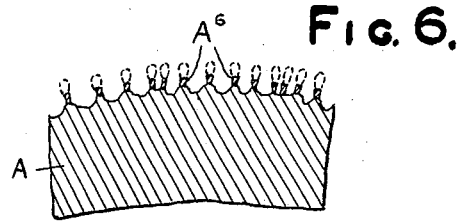
Figure 7:
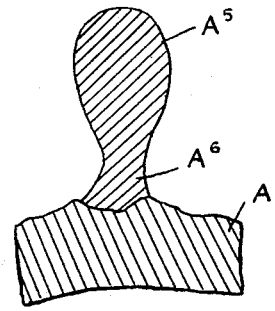
Figure 7 is a still further enlarged view of a small section of the surface of the abrasive wheel at the stage shown in Figure 5
Figure 8:
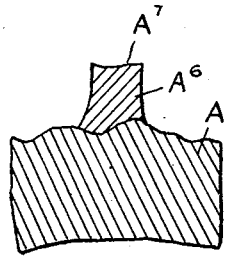
Figure 8 is a similar view to Figure 7 but taken at the stage shown in Figure 6.

In any case, the pitted surface as shown at $A^3$ in Figure 3, is cleaned, for example, in hydrochloric acid, rinsed and then placed in an electrolytic plating bath of hard chromium solution, through which a heavy current is passed in the normal manner. This results in a thick deposit of chromium being deposited round each of the pits, the deposit starting somewhat as indicated at $A^4$ in Figure 4 and then building up into nodules as indicated at $A^5$ in Figure 5, each connected to the metal of the rim of the disc A by a nexus $A^6$, as shown most clearly in Figure 7. After plating to this stage, which may take a matter of a few minutes, the disc A is removed from the plating bath, rinsed, and the globules $A^5$ are broken off as shown in Figures 6 and 8. This leaves exposed the broken surface $A^7$ of each nexus which constitutes in effect a sharp tooth or "grain" of abrasive type cutting metal.

It will be appreciated that by varying the size, form and spacing of the pits it is readily possible to produce the required "grit" in the finished disc. It will also be understood that when the disc is exposed to chemical action during production of the abrasive surface thereon, surfaces which are not to be rendered abrasive may be shielded from chemical action either by appropriate solid shields or by wax or other suitable material applied to them.

Further, although the disc shown by way of example in the drawings is of appreciable width, it will be understood that discs with abrasive rims according to the invention may be made of considerably thinner section than carborundum or similar mineral abrasive discs without risk of fracture, while, owing to the fact that the rim $A^2$ can readily be made slightly wider than the remainder of the disc, binding in the work being treated by the disc can be reduced or eliminated.

When the abrasive surface of a disc as shown in the drawings requires renewal, this surface can readily be re-coated with chromium nodules and the nodules broken off at small cost and in a very short time, so as to provide a new abrasive surface.

The breaking-off of the nodules may be carried out for example by means of a stiff wire brush or by scraping with a hard metal edge, while moreover the nodules so broken off may be used, if desired, for pitting softer materials, as by pressing or rolling them into the surface thereof and then scouring them off.

It will be understood that the normal precautions necessary when chromium-plating must be taken, such, for example, as carrying out the plating immediately after cleaning and rinsing a surface to be plated, in order to ensure good adherence of the chromium coat to the base metal.

In an alternative example of the invention, steel rod, strip or wire, which is to be rendered abrasive may have hardness imparted to it by rolling, drawing or swaging, the material thus work hardened then having pits formed in it, for example, by a chemical or electro-chemical process, as mentioned above, followed by plating as described.

It will be readily understood that the form of the material or surfaces to which the invention is applied may vary within very wide limits and that abrasive tools according to the invention may thus similarly vary widely in form according to their intended use. Further, materials carrying abrasive surfaces according to the invention can be in forms in which satisfactory abrasive surfaces could not previously be provided. For example, abrasive wires may be made according to the invention by treating drawn steel wire by a chemical pitting process followed by chromium coating as described and brushes may be made from such wires and will then be capable of abrading metal objects of such shapes that a solid abrasive tool cannot reach all the parts of the surface to be abraded or even for such purposes as "frosting" a pane of glass.

It is thus to be understood that both the method of manufacturing the abrasive surfaces according to the invention and articles according to the invention having such abrasive surfaces may vary very widely without departing from this invention.

What I claim as my invention and desire to secure by Letters Patent is:

1. A method of forming an abrasive type cutting element according to which a metal surface to be rendered effective for cutting has pits or depressions formed therein, a hard metal suitable for electro-plating on said surface is then applied electrolytically to the pitted surface to build up a series of nodules around the pits and the nodules are then broken off, leaving exposed the broken and highly abrasive surface of the nexus by which each nodule was joined to the base metal.

2. A method of forming a cutting element according to claim 1 wherein the metal surface to be rendered effective for cutting is coated electrolytically with chromium.

3. A method of forming a cutting element as claimed in claim 1, in which after pitting and before plating the surface is hardened.

4. A method of forming a cutting element as claimed in claim 1, in which the base metal on which the hard metal is to be deposited is work hardened by working prior to pitting and plating.

5. A method of forming an abrasive type cutting element according to which a metal surface to be rendered effective for cutting has pits or depressions formed therein by chemical attack, a hard metal suitable for electro-plating on said surface is applied to the pitted surface electrolytically to build up a series of nodules around the pits, and the nodules are then broken off so as to leave exposed the broken and highly abrasive surface of the nexus by which each nodule was joined to the base metal.

6. A method of forming a cutting element as claimed in claim 3, in which the base metal on which the hard metal is to be deposited is work hardened by working prior to pitting and plating.

7. A method of forming a cutting element as claimed in claim 3, in which the base metal is ferrous and the pits are formed by first treating the surface with strong hydrochloric acid, rinsing the surface and then subjecting the surface to nitric acid fumes.

8. A method of forming a cutting element as claimed in claim 3, in which the base metal is ferrous and the pits are formed by subjecting the surface alternately two or more times to treatment by hydrochloric acid followed by treatment by nitric acid fumes.

9. A method of forming an abrasive type cutting element according to which the surface of a ferrous disc to be rendered abrasive has pits or depressions formed therein and is then coated electrolytically with chromium to form nodules on said surface, following which said nodules are broken off close to said surface to provide a multitude of highly abrasive broken nexus thereon.

10. A cutting tool including, a metallic body providing a surface, an irregularly scattered but closely spaced plurality of fine projections extending outwardly from the surface generally at right angles thereto, each projection terminating in a chromium top whose end surface comprises a plurality of irregular sharp jagged projections of uneven outward extent, the terminus of said jagged projections defining, in the main, a surface conforming in outline to said first mentioned surface to provide a cutting area.

11. A cutting tool including a metallic body providing a surface comprising an irregularly scattered but closely spaced plurality of fine projections extending outwardly therefrom, each projection terminating in a top of hard metal such as chromium adherent to said body whose end surface comprises a plurality of irregular sharp jagged projections of uneven outward extent, the terminus of said jagged projections defining, in the main, a surface conforming in outline to said first mentioned surface to provide a cutting area.

GEORGE DAVIES.

REFERENCES CITED

The following references are of record in the file of this patent:

UNITED STATES PATENTS

| Number | Name | Date |
|---|---|---|
| 416,805 | Ridge | Dec. 10, 1889 |
| 1,255,819 | Moffat | Feb. 5, 1918 |
| 1,314,450 | Whyte | Aug. 26, 1919 |
| 1,501,049 | Harper | July 15, 1924 |
| 1,631,212 | King | June 7, 1927 |
| 1,770,157 | Humphries | July 8, 1930 |
| 1,848,408 | Bauer | Mar. 8, 1932 |
| 1,956,169 | Geistharp et al. | Apr. 24, 1934 |
| 2,092,130 | Lyons | Sept. 7, 1937 |
| 2,114,072 | Cleveland | Apr. 12, 1938 |
| 2,177,751 | Sikorski | Oct. 3, 1939 |
| 2,248,530 | Granger et al. | July 8, 1941 |
| 2,275,420 | Clark et al. | Mar. 20, 1942 |
| 2,314,604 | Van der Horst | Mar. 23, 1943 |